United States Patent [19]

Elter et al.

[11] 4,424,531

[45] Jan. 3, 1984

[54] INSPECTION DEVICE WITH TELEVISION CAMERA FOR NUCLEAR INSTALLATIONS

[75] Inventors: Claus Elter, Bad Durkheim; Hubert Handel, Rimbach; Hans-Juergen Heiland, Bruehl-Rohrhof; Hermann Schmitt, Langmeil; Josef Schoening, Hambruecken, all of Fed. Rep. of Germany

[73] Assignee: Hochtemperatur-Reaktorbau GmbH., Cologne, Fed. Rep. of Germany

[21] Appl. No.: 265,693

[22] Filed: May 20, 1981

[30] Foreign Application Priority Data

May 27, 1980 [DE] Fed. Rep. of Germany ....... 3020093

[51] Int. Cl.³ ............................................. H04N 7/18
[52] U.S. Cl. .................................................. 358/100
[58] Field of Search ..................... 358/93, 98, 99, 100, 358/108, 95, 210; 356/241

[56] References Cited

U.S. PATENT DOCUMENTS

| 2,849,530 | 8/1958 | Fleet ................................... 358/100 |
| 2,912,495 | 11/1959 | Moon et al. ........................ 358/100 |
| 4,229,762 | 10/1980 | Healy ................................. 358/100 |

FOREIGN PATENT DOCUMENTS

| 948003 | 1/1964 | United Kingdom ................ 358/100 |
| 1058851 | 2/1967 | United Kingdom ................ 358/100 |
| 1064941 | 4/1967 | United Kingdom ................ 358/100 |

Primary Examiner—Joseph A. Orsino, Jr.
Attorney, Agent, or Firm—Schwartz, Jeffery, Schwaab, Mack, Blumethal & Koch

[57] ABSTRACT

An inspection device for the inspection of internal spaces in nuclear reactor installations requires extremely small dimensions while being capable of use at high temperatures and exposures to radiation during shutdown periods of the reactor. The device is designed so that it is readily adapted to a particular inspection purpose. The particular device meeting these requirements comprises a camera arranged in a tube and cooled in such tube. The objective of the camera and/or a mirror are each connected with means for relative movement. A source light and the movement means are designed as separate structural elements which may be assembled in different combinations in a modular fashion.

7 Claims, 7 Drawing Figures

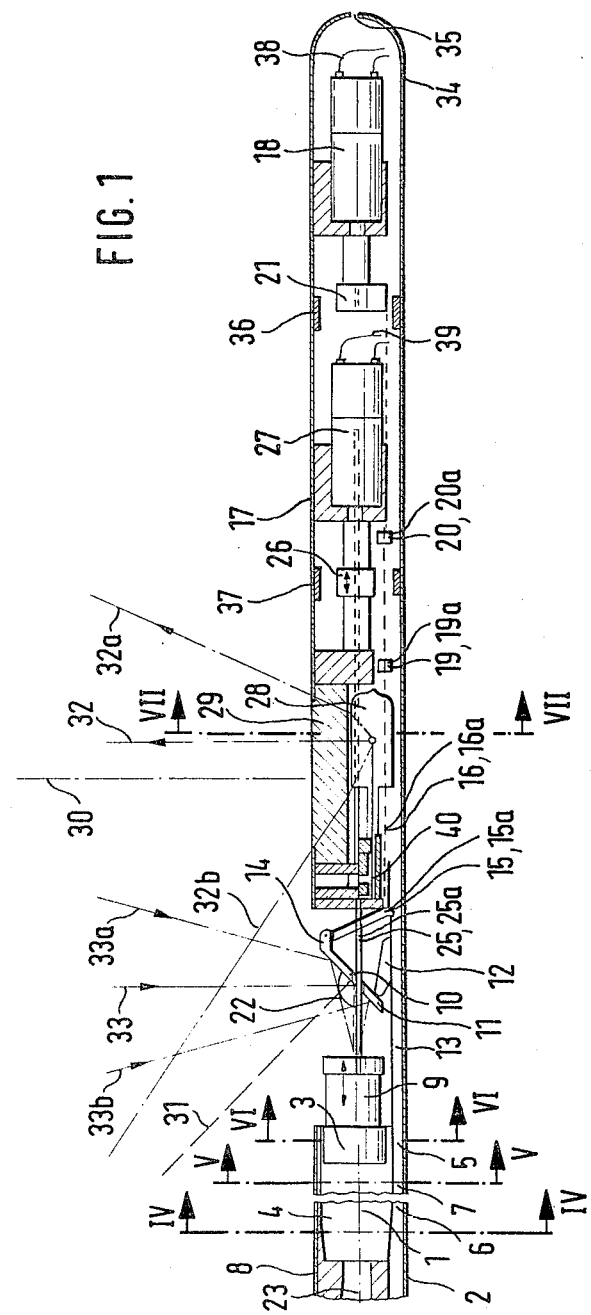

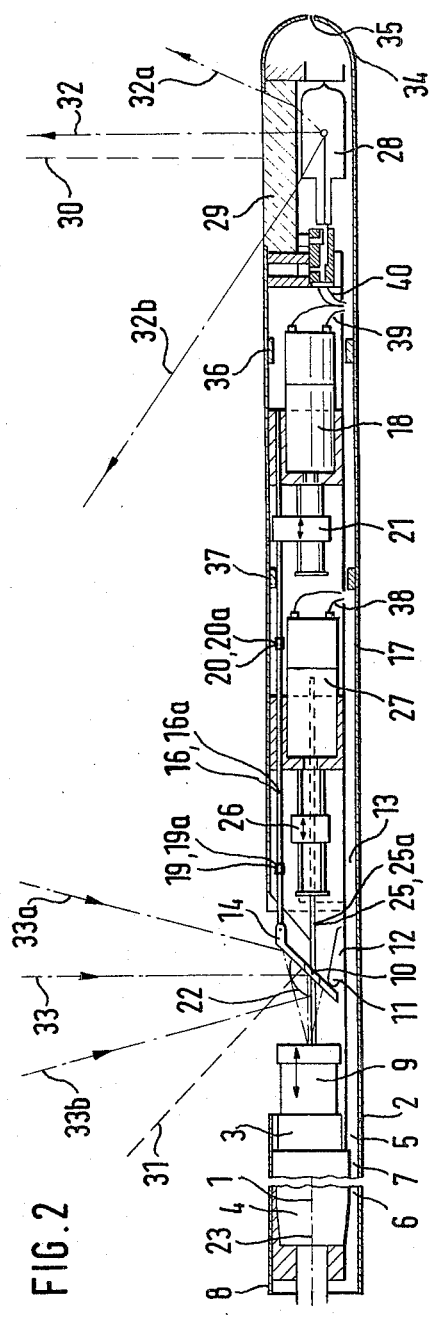
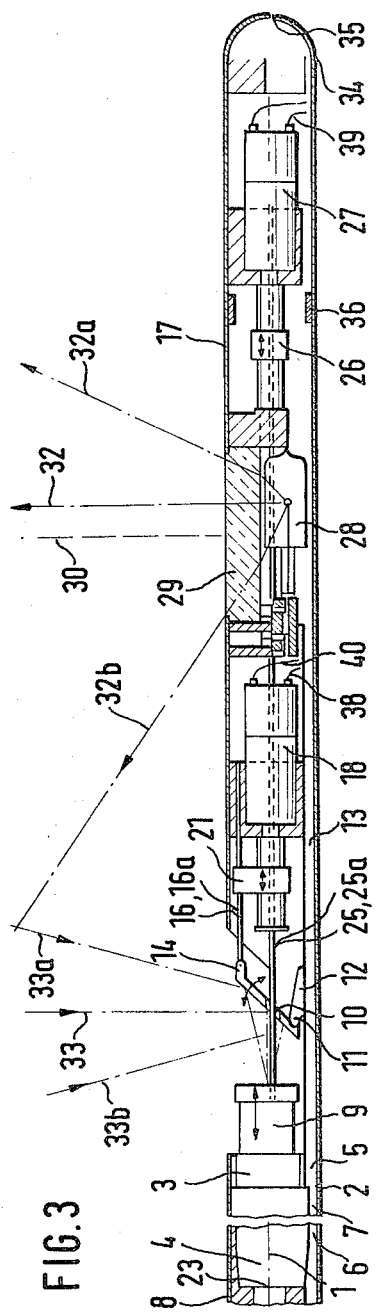

INSPECTION DEVICE WITH TELEVISION CAMERA FOR NUCLEAR INSTALLATIONS

BACKGROUND OF THE INVENTION

1. Field of the Invention

The invention concerns a television camera for the inspection of internal spaces in nuclear reactor power plants. More particularly, the invention relates to an inspection device with a television camera having a mirror and a source of light in front of its objective for use in nuclear installations and more particularly, gas cooled nuclear reactors.

2. Background of the Prior Art

It is known to use television cameras for the inspection of activated internal space and other difficultly accessible locations in nuclear installations. In the process, the television camera is mounted on the end of a shaft or a manipulator. The shaft is passed through an existing passage in the concrete wall of the reactor vessel or through an orifice in the vessel. The mounted camera is controlled from the outside. The camara detects by viewing the condition of a localized area or the individual structural parts of the reactor. The viewing information is electrically or electromagnetically transferred to a display instrument outside the reactor and evaluated. A camera designed in this manner is preferably used only in repeated tests, wherein the camera is inside the reactor only during the examination itself. After removal the camera is decontaminated. In order to obtain information of satisfactory value during the inspection to be performed, the reactor is specifically arranged prior to the startup of the reactor. Any changes occurring in the more important reactor core components during operation of the reactor are then detected by the camera in a simple fashion. The detection is simple because "before-after" comparisons can then be made. The arrangement and layout of the individual components of the reactor prior to the startup are compared with arrangements and layouts during repeated inspections and are found to be particularly effective. The changes detected indicate the extent of any damage in the reactor. In the process, for example, the steam generator is provided with initial markings. The position of the initial markings with respect to the internal wall or a certain point on the portion of the reactor vessel is recorded. These markings are then located in the field of vision of the camera used in the inspection. Any changes taking place in the technical condition of the steam generator, for example in its suspension, are clearly indicated by a shift from the marked location. It is further desirable to be able to inspect with one camera the largest possible part of the inner space, i.e., to use a camera which by virtue of its design may be employed in more than just one type of inspection.

SUMMARY OF THE INVENTION

It is an object of the invention to provide a television camera with extremely small dimensions for the inspection of internal spaces in nuclear reactor installations. The camera is usable at high temperatures and exposures to radiation during downtimes of the reactor for the inspection of internal spaces. The camera has a configuration easily adaptable to a particular inspection purpose.

The invention has the advantages that known and commercially available miniature cameras can be used for the inspection of the internal spaces of a nuclear reactor. Conditions are created during use wherein the negative effects of high temperatures and pressures acting on the camera are eliminated or minimized. In addition, the camera is equipped with specialized components to facilitate the inspection process and thereby simplify testing.

Additional advantages obtained by the invention include an efficient, compact, space-saving, economical, easily manipulated and variable inspection device, as well as a device which is readily and simply adapted to the existing object of the inspection.

The above-defined objects and advantages are attained according to the invention by arranging the camera in a tube having a means for cooling the camera. In addition, the camera components such as the objective and/or the mirror, movement means such as motors for the objective and/or mirror and the illumination means or light source are designed as separate structural parts to be combined with each other in the manner of building modules in different combinations.

According to the invention, the camera is arranged in a tube and rigidly mounted with it. The rigid mounting is obtained, preferably by means of two eccentric rings arranged at the start and the end of the camera, with the inner diameter of said rings corresponding to the diameter of the camera and their external diameter corresponding to the inner diameter of the tube. A segment of the rings is divided. The separation of segments of the rings creates passages between the camera and the tube at the ring mountings which permit the supply of the necessary cooling gas and the location of electric conductors. In addition, the arrangement of the rings on the camera provides a gap between the tube and the camera intended for the flow of cooling gas in the area of the camera.

An additional connecting tube is joined to the end of the tube in a preferred embodiment connecting the camera with the manipulator and to the source of cooling gas.

In front of the objective which projects from the tube, a swivelling mirror is arranged. This mirror preferably is connected with a tube extension on one end by a projection and an articulated shaft and at its other end, by a second articulated shaft, a mirror motor and a means connecting the second articulated shaft and the motor, preferably two rods. Upon the actuation of the motor, the axial motion of the rods is transmitted to the mirror, whereby the angle between the principal axis of the camera and the mirror surface is enlarged. When the motor is reversed, the rods move in the opposite direction and the angle is reduced. It is advantageous to vary the angle as continuously and slowly as possible. For this reason, the rods are driven by the motor through a transmission. In the knowledge of the relationship between the number of revolutions of the motor and the change in the angle, it is possible to determine the instantaneous angle. This fact is of importance as during the inspection certain areas are examined, which are otherwise inaccessible during the entire operating period of the reactor and the images recorded or appearing in the monitor may be verified only by means of comparison and calculation. Angles smaller than 90° and larger than 170° are not considered since no usable mirror reflections of the area to be examined are obtained within the angular range.

The sharpness of the image appearing in the monitor may be adjusted by means of an axial motion of the objective. As in the case of the mirror, the objective is provided with a means for moving the objective. In a preferred embodiment the means comprises an objective motor connected through two rods with the objective. Upon actuation or reversal, the objective moves axially in one or the other direction. In a preferred embodiment, the rods for the driving of the mirror and the objective are individual components and are connected with each other by way of couplings.

A light source is arranged behind the mirror according to the invention. This arrangement precludes the direct illumination of the objective by that source of light and only the reflected light projected from the areas inspected by way of the mirror is received. The internal layout of the reactor, in particular the areas subject to repeated inspections, pose high requirements concerning the quality and intensity of the light source. Good illumination may be obtained with a micro-halogen lamp, wherein the entire illuminating installation is additionally provided with a circular or parabolic, polished reflector or with a condensing lens.

The individual structural parts of the inspection device with the television camera are arranged in a tube or the extension of the tube and are designed according to the invention in the form of separate structural parts. These parts are assemblable in the manner of structural modules in various possible combinations. The tube extension is connected by means of a conduit with the tube and has a cooling gas orifice at its end. The modular layout of the individual structural parts makes it possible to adapt the television camera to the given inspection purpose in an optimum manner. The illuminating installation with the objective and the mirror motors are particularly suitable for variable arrangements. For example, during the inspection of gaps and narrow areas of a nuclear power plant, it is advantageous to arrange the light source in the vicinity of the mirror. In certain instances, the intended locations are not illuminated at all. In other instances, it is convenient to arrange the light source at the end of the tube extension, such as for inspection of the reactor liner or the core element removal tube. Thus, the arrangement of the individual structural elements housed in the tube extension is based on the specific purpose of the inspection. The television camera is mounted on a shaft and on the end of a manipulator, making possible radial movements of the camera.

The entire inspection device is supplied with electric power and exposed to cooling gas. The cooling gas is supplied through another tube which connects with the tube surrounding the camera at its end. The camera is subjected to the cooling gas which moves through a cooling gas and cable channel into the tube extension and flows at its end through a cooling gas outlet into the internal area of the reactor. Electrical conductors supplying the light source and the various motors with power are arranged in the cooling gas gap and the cooling gas channel to the structural parts involved.

The inspection device according to the invention for inspection of internal spaces in nuclear reactor installations consists essentially of a camera housed in a tube and having in front of its objective an integrated assembly to improve the exposure capacity of the camera to a substantial extent.

BRIEF DESCRIPTION OF THE DRAWINGS

The several embodiments of the invention shall be explained in more detail hereinafter with the aid of the drawings.

In the drawings:

FIG. 1 shows an inspection device having a camera in a cooling tube with several motors and a source of light;

FIG. 2 depicts an inspection device with a different arrangement of the motors and the light source;

FIG. 3 demonstrates a further possible arrangement of the camera motors and the source of light;

DETAILED DESCRIPTION OF THE PREFERRED EMBODIMENTS

Figure 4:
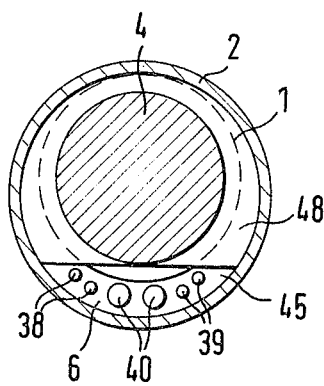
FIG. 4 illustrates an enlarged cross section along the line IV—IV according to FIG. 1 (scale altered)

The REES camera shown in FIG. 1 is represented in an abbreviated form and housed in a tube 2. A rigid mounting between the camera 1 and the tube 2 is effected by means of two eccentric rings (not shown). The rings are placed at the start 3 and end 4 of the camera 1, and have an inner diameter corresponding to the diameter of the camera 1, an external diameter corresponding to the inner diameter of the tube 2 and segments partitioned from them. The separation of the segments from the two rings creates at the mountings 3 and 4, the passages 5 and 6 through which the cooling gas flows and which is traversed by electrical conductors. It is further the purpose of the rings to form a gap 7 between the camera 1 and the tube 2, to make possible the contacting of the camera with cooling gas. A further tube (not shown) follows the end 8 of the tube to connect the camera with a manipulator or camera movement control means (not illustrated).

The swivelling mirror 10 is arranged in front of the camera lens or objective 9 which projects from the tube and is axially movable. The mirror is connected by way of an articulated shaft 11 and a projection 12 with a cooling gas and cable channel 13 and on top with a mirror motor 18 by means of an articulated shaft 14, two levers 15 and 15a and two rods 16, 16a. The mirror motor is housed in a tube extension 17.

The rods 16 and 16a consist of several individual parts connected with each other by couplings 19 and 19a. Between the rods 16 and 16a and the mirror motor 18, a transmission 21 is arranged to transmit the effect of the mirror motor 18 to the rods 16 and 16a. Upon the actuation of the mirror motor 18, the rods 16 and 16a move in the direction of the mirror motor 18 whereby the angle 22 between the mirror 10 and the principal axis 23 is enlarged. When the mirror motor 18 is reversed, the rods 16 and 16a move in the opposite direction and the angle 22 is reduced. The sharpness of the image appearing on the monitor is adjusted by an axial movement of the objective 9. The objective 9 is connected by way of the rods 25 and 25a to a transmission 26 with the objective motor 27, which effects the axial motion of the objective 9. Upon the actuation or reversal of the objective motor 27, the objective 9 moves in the direction of the objective motor 27 or the opposite direction, respectively. In front of the objective motor 27, an illuminating means is arranged. The illumination means comprises a halogen bulb 28, a condensor lens 29 and a reflector (not shown). During the mounting of the lens 29 and the mirror 10 on the cooling gas and cable channel 13 and the tube extension 17, it must be assured that the lens axis 30 and the normal 31 to the mirror 10 passing through its center are in the same plane. The light 32, 32a, 32b emitted by the halogen bulb 28 illuminates the internal space of the reactor, is reflected from it and the reflected light 33, 33a and 33b is passed by way of the mirror 10 into the objective 9. A 150 watt halogen bulb is chosen for illumination. The thermal energy emitted by this light may affect the operation of the other components arranged in the tube extension 17. For this reason, cooling gas flows during the operation of the camera through the entire illumination device. It is conducted at the end 34 of the tube extension 17 through the cooling gas outlet 35 into the inner space of the reactor. The tube extension consists of several pieces interconnected by means of plug connectors 36 and 37. The electric components arranged in the tube extension are supplied by means of the electric conductors 38, 39 and 40 with current.

The different arrangement of the light source 6 is shown in FIG. 2. The mirror motor 18 and the objective motor 27 operate in principle identically with the arrangement of FIG. 1. As the light source 28 is arranged at the end of the tube extension 17, the connecting rods 16, 16a, 25 and 25a may be placed in a correspondingly simpler manner. The mirror 10 is hereby connected directly with the rods 16 and 16a by way of the articulated shaft 14. An arrangement of this type is used preferably in cases where the distance between the objective 9 and the object being viewed is large.

FIG. 3 shows an arrangement wherein the light source 28 is located between the mirror motor 18 and the objective motor 27. Here again, there is a direct connection between the mirror 10 and the rods 16 and 16a by way of the articulated shaft 14.

The further arrangements shown in FIGS. 2 and 3 of the individual components housed in the tube extension 17 are achieved by a simple rearrangement of the entire modular layout of the device in front of the objective 9. In this embodiment, the rearrangement is simple due to the plug connectors 36 and 37 in each modular part.

FIG. 4 shows an enlarged cross section along the line IV—IV according to FIG. 1. Here, the tube 2, the camera 1, the end 4 of the camera, the ring 48 and the segment 45 are shown. The gap 6 created by the separation of the segment 45 from the ring 48 receives the conductors 38, 39 and 40.

Figure 5:
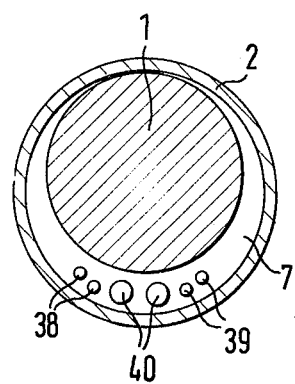
FIG. 5 shows a cross section along the line V—V according to FIG. 1.

FIG. 5 shows a cross section along the line V—V according to FIG. 1. The arrangement of the camera 1 in the tube 2 creates the gap 7 through which the cooling gas flows. The conductors 38, 39 and 40 are also placed in the gap 7.

Figure 6:
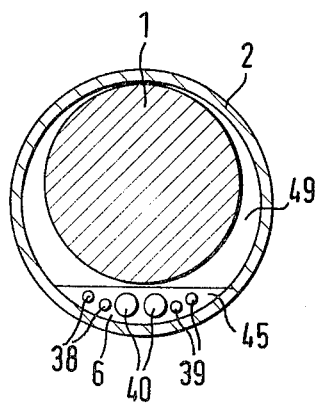
FIG. 6 depicts a cross section along the line VI—VI according to FIG. 1.

FIG. 6 shows a cross section along the line VI—VI according to FIG. 1. FIG. 6 displays the tube 2, the camera 1, the eccentric ring 49. The separation of the segment 45 creates the passage 6 wherein the conductors 38, 39 and 40 are arranged.

Figure 7:
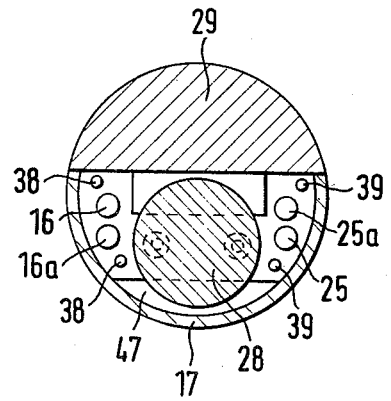
FIG. 7 demonstrates a cross section along the line VII—VII according to FIG. 1.

FIG. 7 shows a cross section along the line VII—VII according to FIG. 1. It displays a condensor lens 29 mounted on the tube extension 17. The halogen lamp 28 and the conductors 38 and 39 as well as the rods 16, 16a and 25 and 25a are also shown. The gap 47 provides a flow of the cooling gas.

The inspection device illustrated in these drawings can easily be inserted in various passageways through the walls in a nuclear reactor installation. Such installations include the well known gas cooled nuclear power plants. Examples of these reactor installations and the various component parts thereof are disclosed in U.S. Pat. Nos. 4,045,285; 4,118,276 and 4,175,001 the disclosures of which are incorporated herein by reference.

The specification and drawings set forth preferred embodiments of the invention. It should be noted, however, that the invention is not limited to those specific embodiments and methods specifically disclosed, but extends instead to all embodiments, substitute and equivalent constructions falling within the scope of the invention as defined by the claims.

What is claimed is:

1. An inspection device for insertion into nuclear reactor installations comprising:
    a tubular housing;
    a television camera mounted in said tubular housing and having a variable objective in an axial direction;
    means for cooling said television camera;
    a mirror movably arranged in front of the objective of said television camera;
    an extension member supporting said mirror and extending from said tubular housing;
    means for selective illumination of the area surrounding said tubular housing;
    means for movement of said mirror relative to said television camera objective;
    wherein said selective illumination means and said movement means are housed in tubular modules having the same tubular diameter as the tubular housing and adapted to connect directly and in an interchangeable sequence to said tubular housing and extension member.

2. The inspection device of claim 1, wherein said means for movement comprises an electric motor mounted for imparting movement in the objective of said television camera.

3. The inspection device of claim 1, wherein said mirror is mounted in said extension member between said tubular housing and said tubular modules.

4. The inspection device of claim 1, wherein said cooling means comprises a cooling conduit located in said tubular housing and adapted for connection to a cooling circuit.

5. The inspection device of claim 4 further comprising electrical conductors arranged in said cooling conduit and connected to said television illumination means and movement means for conducting electrical current between said inspection device and external electrical equipment.

6. The inspection device of claim 1, wherein said means for movement comprises an electric motor mounted for imparting movement to said mirror.

7. The inspection device of claim 6, wherein said means for movement further comprises a first articulated shaft attached to said mirror and a second articulated shaft each of said articulated shafts attached to a rod attached to said electric motor.

* * * * *